(12) United States Patent
Booth et al.

(10) Patent No.: US 10,241,624 B2
(45) Date of Patent: *Mar. 26, 2019

(54) ENERGY SENSING LIGHT EMITTING DIODE DISPLAY

(71) Applicant: Intel Corporation, Santa Clara, CA (US)

(72) Inventors: Lawrence A. Booth, Phoenix, AZ (US); Daniel Seligson, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,769

(22) Filed: May 18, 2017

(65) Prior Publication Data

US 2017/0357379 A1 Dec. 14, 2017

Related U.S. Application Data

(63) Continuation of application No. 14/629,311, filed on Feb. 23, 2015, now Pat. No. 9,665,211, which is a continuation of application No. 13/218,277, filed on Aug. 25, 2011, now Pat. No. 8,963,817, which is a continuation of application No. 12/023,894, filed on Jan. 31, 2008, now Pat. No. 8,026,879, which is a continuation of application No. 10/037,437, filed on Dec. 31, 2001, now Pat. No. 7,348,946.

(51) Int. Cl.
*G06F 3/042* (2006.01)
*G09G 3/3208* (2016.01)
*G06F 3/038* (2013.01)
*G06F 3/041* (2006.01)
*G06F 3/0354* (2013.01)

(52) U.S. Cl.
CPC .......... *G06F 3/0421* (2013.01); *G06F 3/0386* (2013.01); *G06F 3/03542* (2013.01); *G06F 3/042* (2013.01); *G06F 3/0412* (2013.01); *G09G 3/3208* (2013.01); *G09G 2300/0426* (2013.01); *G09G 2320/043* (2013.01); *G09G 2320/0626* (2013.01); *G09G 2320/0673* (2013.01); *G09G 2320/0693* (2013.01); *G09G 2360/144* (2013.01); *G09G 2360/145* (2013.01)

(58) Field of Classification Search
None
See application file for complete search history.

(56) References Cited

U.S. PATENT DOCUMENTS 6,144,165 A * 11/2000 Liedenbaum ........ G09G 3/2011
315/169.1
6,498,602 B1 * 12/2002 Ogawa ................ G06F 3/03545
178/18.01

\* cited by examiner

*Primary Examiner* — Christopher J Kohlman

(57) ABSTRACT

A display that includes energy sensors within the display itself is disclosed. An Organic Light Emitting Diode (OLED) can be made to operate both as a light emitter and as an energy detector. When forward biased with an appropriate driving signal, the OLED emits light via electroluminescence, which can be used to make a portion of an image on the display. In another mode, the OLED can detect energy by converting incoming photons or energy into an electrical signal by the photoelectric effect. By operating OLEDs in the display in both emissive and sensing modes, energy that shines on the display, such as from an outside source can be detected at the same time an image is shown. Additionally, a display including OLEDs can detect light energy generated by the display itself.

20 Claims, 9 Drawing Sheets

|    |    |    |    |    |    |    |    |
|----|----|----|----|----|----|----|----|
| A1 | A2 | A3 | A4 | A5 | A6 | A7 | A8 |
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |

- DIODE IN EMIT MODE

- DIODE IN SENSING MODE

- DIODE OFF; NEITHER SENSING NOR EMITTING

ENERGY SENSING LIGHT EMITTING DIODE DISPLAY

CROSS REFERENCE TO RELATED APPLICATIONS

This application is a continuation of copending U.S. patent application Ser. No. 14/629,311, entitled ENERGY SENSING LIGHT EMITTING DIODE DISPLAY, filed Feb. 23, 2015, which is a continuation of U.S. patent application Ser. No. 13/218,277, entitled ENERGY SENSING LIGHT EMITTING DIODE DISPLAY, filed Aug. 25, 2011, now U.S. Pat. No. 8,963,817, issued Feb. 24, 2015, which is a continuation of U.S. patent application Ser. No. 12/023,894, entitled ENERGY SENSING LIGHT EMITTING DIODE DISPLAY, filed Jan. 31, 2008, now U.S. Pat. No. 8,026,879, issued Sep. 27, 2011, which is a continuation of U.S. patent application Ser. No. 10/037,437, entitled ENERGY SENSING LIGHT EMITTING DIODE DISPLAY, filed Dec. 31, 2001, now U.S. Pat. No. 7,348,946, issued Mar. 25, 2008, the disclosure of which is herein incorporated by reference in its entirety.

TECHNICAL FIELD

This disclosure relates to displays made from electroluminescent materials, and, more specifically to displays made from light emitting diodes that can emit light via electroluminescence, and can also sense light or other energy.

BACKGROUND

There are several types of display devices available for producing text or images for viewing. Presently, the most prevalent display types are Cathode Ray Tubes (CRTs), which make up the majority of desktop displays and televisions, and Liquid Crystal Displays (LCDs), which make up the majority of displays of portable devices, such as laptop computers, telephones, and personal digital assistants (PDAs).

Several other types of displays are not as well known, but are either available in limited quantities or are still being developed, such as plasma displays, Field Emission Displays (FEDs), Digital Light Processing (DLP) (a form of Micro Electro Mechanical Systems (MEMS)), Image Light Amplifiers (ILAs), and Light Emitting Diodes (LEDs). Each of these system types can generate displays for direct viewing, or can project an image on a surface for indirect viewing.

Many of these types of displays have problems with output uniformity from one picture element (pixel) to the others. For instance, in FED and LED systems, some individual pixels may generate more light for a given amount of driving signal than others. During the production of these displays, each pixel in the display is calibrated by individually lighting it and measuring the individual pixel's light intensity output. The measurements are compared to the output of the other pixels in the display. Adjustments are then made, such as by decreasing or increasing the drive signal when displaying that pixel, i.e., trimming (calibrating) the display circuitry for driving the pixels. This calibration can be done for a single level of the driving signal, or the driving signal can be varied throughout the entire gamma curve so that the pixels are measured at different levels of input, from being fully off to being fully on.

This uniformity test and calibration is typically done at manufacturing time, and the adjustments are usually permanently made. Therefore, if the output performance of the individual pixels changes over time, image quality of the display can degrade.

Another problem that some displays have is maintaining overall correct display brightness for the amount of light in the room. For instance, when the room itself is brightly lit, the display must be bright as well to be seen above the ambient light. When the room is dimly lit, a bright display would be overpowering and difficult to view, unless the display is darkened. Some displays can automatically adjust their brightness level in response to other light in the room. They do this by including a photosensor to sense the ambient room light, and then adjust the brightness of the entire display based on the sensor output. One problem with this system is that the sensor may be in an unusually bright or dim area compared to the majority of the display, giving a reading that is inaccurate for the entire display. For instance the sensor may be in a shadow, while the majority of the screen is in bright light. Using multiple sensors in various locations of the screen may help the problem, but this solution increases the complexity and the cost of the display. None of the sensors can be directly in front of the display otherwise they would cover the display. Therefore, no matter how many photosensors are included around the display, none of the sensors are actually measuring light on the display itself, but rather only measure light around the display screen.

Embodiments of the invention address these and other deficiencies in the prior art.

BRIEF DESCRIPTION OF THE DRAWINGS

The description may be best understood by reading the disclosure with reference to the accompanying drawings.

FIG. 7 is a front view of a display showing individual pixels in a display made from OLEDs according to embodiments of the invention.

FIG. 8 is a front view of the display shown in FIG. 7 with a portion of the display covered by a shadow.

DETAILED DESCRIPTION

Embodiments of the invention include a display made from LEDs, such as Organic LEDs (OLEDs) that can alternately produce visible light and measure light energy shining on the display. When forward biased by a voltage and injected with electron-hole pairs, the OLEDs emit photons that can be used to produce a display image. When the OLEDs are reverse biased, they act as photodiodes and can measure an amount of light energy sensed by them. The OLEDs can measure light falling on them from external sources from outside the display, or can measure light that is generated by neighboring OLEDs. Switching circuits alternate the OLEDs between an emit mode and a sense mode.

OLEDs operate on a principle of converting electrical energy directly into light energy, a process termed electroluminescence. To produce electroluminescence in an OLED, first the OLED is forward biased by an external voltage. Then electrons and holes are injected into a special organic material selected for its ability to electroluminescence. The electrons and holes meet in the organic material and join together into an electron-hole pair ("pair"), and in so doing can generate a photon, thus producing light. When a matrix of OLEDs are grouped in a display, and individually driven, they can be used to form an image viewable on the display.

Figure 1:
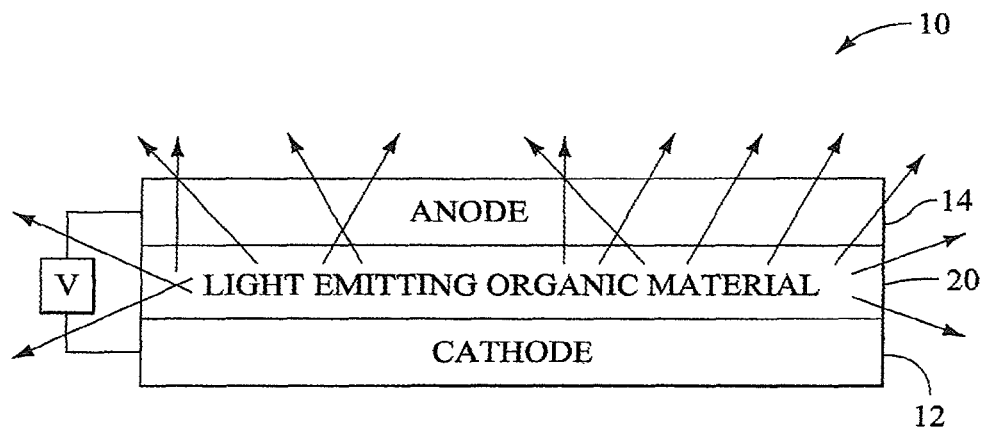
FIG. 1 is a cross-sectional diagram showing the layers used to make an Organic Light Emitting Diode.

FIG. 1 shows an example of an OLED 10. In its simplest form, the OLED 10 includes a cathode 12 for injecting electrons, an anode 14 for injecting holes, and a layer of organic material 20 where the electrons and holes can be combined. In many OLEDs 10, the anode 14 is transparent, or nearly transparent, so that light generated by the organic layer 20 can exit through the anode and be seen by a viewer. Also, generally, the cathode 12 is made from a reflective material, so that any photons that exit the organic layer 20 in the direction of the cathode are reflected off the cathode and back through the organic layer and out of the OLED 10, adding to the brightness of the display.

Figure 2:
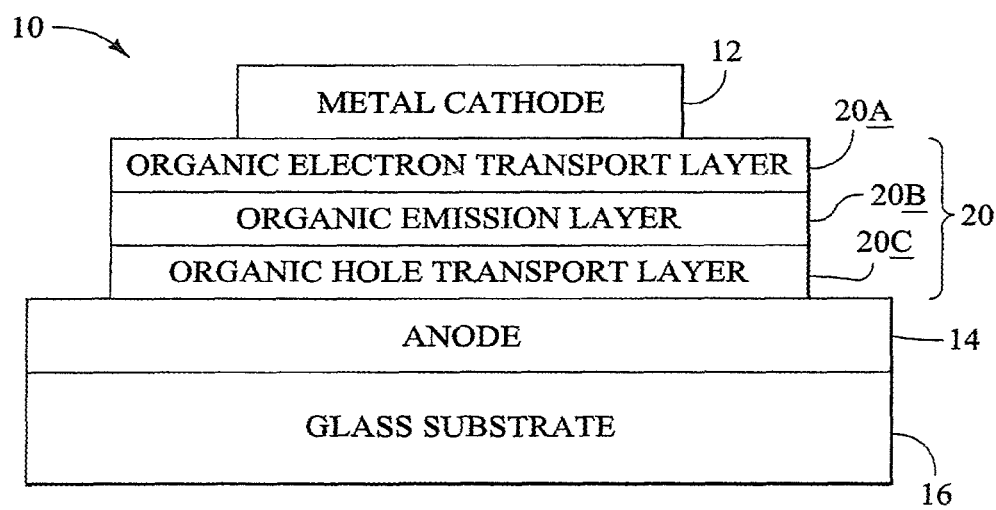
FIG. 2 is a cross-sectional diagram showing additional layers that can be used to make the organic "layer" of FIG. 1.

The organic layer 20 may be made of several different layers, each optimized for a specific function. FIG. 2 shows an example of an OLED 10 formed on a substrate 16, such as glass, where the organic material 20 is formed of three layers. A layer 20A sits adjacent to the cathode 12, and is selected as an optimal electron transport layer. Similarly, a layer 20C sits adjacent to the anode 14 and is selected for its ability to transport holes. A central layer 20B is optimized to produce photons from the electron-hole pairs. Although three distinct layers are shown in FIG. 2, each of the layers can in turn be formed from one or more layers of different materials. Therefore the organic layer 20 can be formed of any number of layers, in an effort to produce the best amount of photons in the OLED 10. To avoid confusion, the layer of organic material will be generically referred to as 20, unless distinction between the individual layers 20A, 20B, 20C is necessary.

In addition to choosing an organic layer 20 that generates the best amount of photons, the material making the organic layer must be selected to generate photons of a certain color. Typically a display is made of tiny adjacent pixel areas where one area produces a red signal (red pixel), one area a green signal (green pixel), and one area a blue signal (blue pixel). Oftentimes this is called an RGB display, for Red, Green and Blue. A typical display has three different OLEDs adjacent to one another, each having an organic layer 20 that produces either red, green or blue photons, respectively. Some OLEDs are formed from a stack of several organic layers 20, and use transparent cathodes 12 and anodes 14 so that all three colors can be generated in the same physical pixel area. These OLEDs are called Stacked OLEDs (SOLEDs), and can produce very fine detail because they have three times the density of non-stacked OLEDs. Typical displays for laptop computers have 1024 column pixels and 768 row pixels for each of the three colors red, green and blue. An advantage to using SOLEDs for these displays is that only 1024×768 pixels are used, and not three times that amount, because each of the pixels in a SOLED display is capable of producing a signal in red, green and blue at the same time. Managing the output of each of the different colored OLEDs so that an overall uniform image is produced is a difficult task, for all types of OLEDs.

As mentioned above, to generate photons from the organic layer 20, the OLED 10 must be under forward bias, i.e., a positive voltage is applied between the anode 12 and the cathode 14. An interesting phenomenon occurs when an OLED 10 is not biased, or under reverse bias; it becomes a photodiode, or photodetector.

Figure 3:
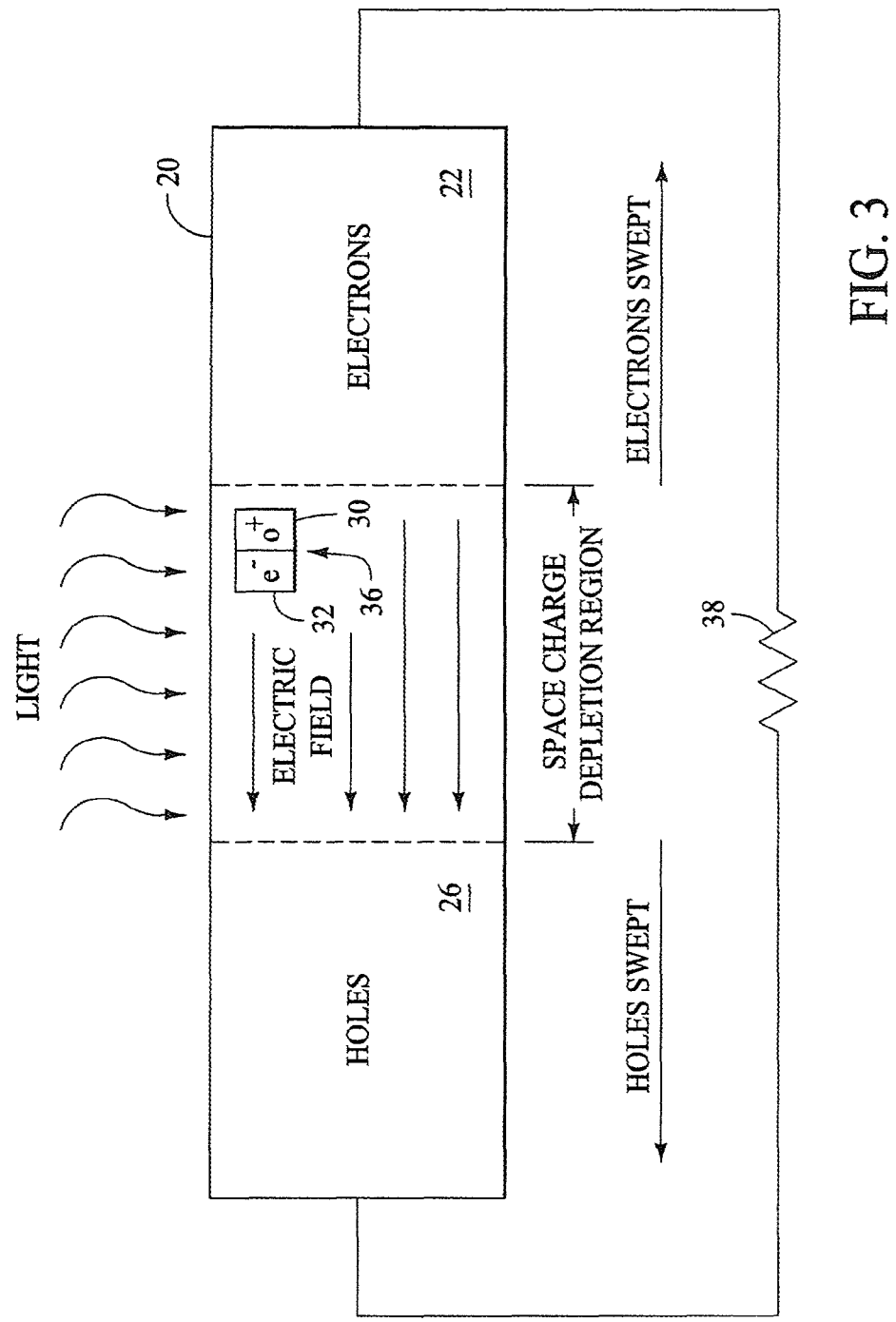
FIG. 3 is a diagram showing the operation of the photoelectric effect in solid state devices.

FIG. 3 illustrates photodetection in a solid state device. In FIG. 3 only the organic layer 20 portion of the OLED 10 is shown. The organic layer 20 in FIG. 3 is divided into different separate regions, 22, 24, 26, but, even though they may be similar, these regions do not necessarily correspond to the layers 20A, 20B and 20C of FIG. 2. The region 22 (electron region) has an excess of electron carriers and the region 26 (hole region) has an excess of hole carriers. Between the electron region 22 and hole region 26 is a space charge depletion region (SCDR) 24. The SCDR 24 has a built in electric field, which begins at the electron region 22 and extends to the hole region 26.

When a photon (light energy) enters the SCDR 24 having an energy level at least as large as a bandgap voltage of the organic layer 20, the photon can create an electron-hole pair 30, which is made of an electron 32 and a hole 36. Because the electron 32 has a negative charge, and the hole 36 has a positive charge, they are both immediately swept out of the SCDR 24 in opposite directions, due to the presence of the electric field. The electron 32 is swept into the electron region 22 and the hole 36 is swept into the hole region 26. If a circuit is made between the electron region 22 and the hole region 26, this sweeping action can cause a current (photocurrent) to flow between these regions.

Figure 4:
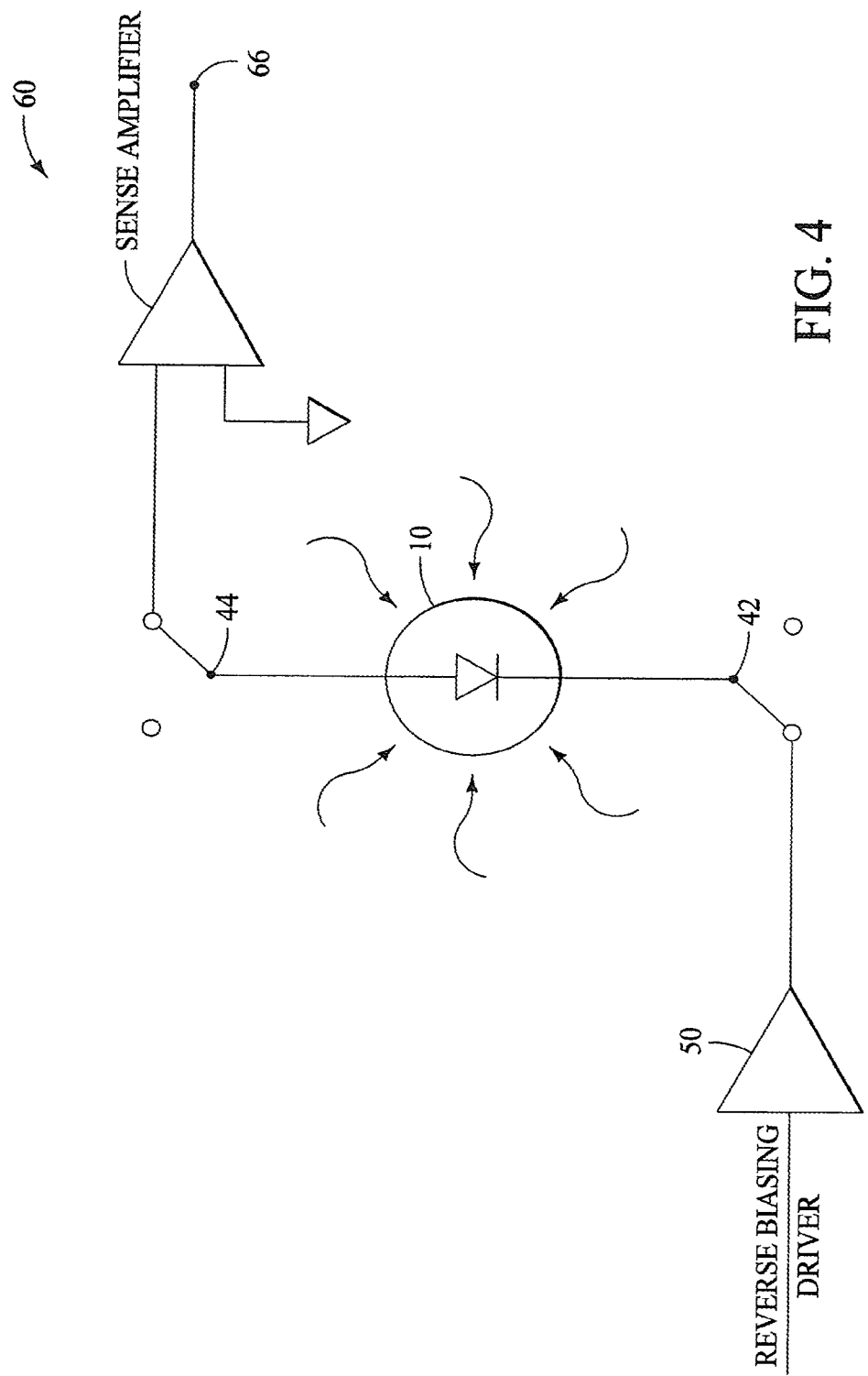
FIG. 4 is a circuit diagram showing circuitry used in conjunction with embodiments of the invention.

The photodiode of FIG. 3 may operate even with zero outside bias. But because the SCDR 24 increases in width when under reverse bias, and because more photons land on the SCDR the wider it is, the OLED 10 is more sensitive to light and a better photon detector when the OLED is reverse biased. Therefore, the OLEDs 10 are usually reverse biased when they are in the light sensing mode. A sense driving circuit for applying reverse bias and measuring light energy falling on an OLED 10 is shown in FIG. 4, and generally indicated at 40. In that figure, the OLED 10 is reverse biased by a positive voltage applied at a front terminal 42. In one embodiment, the reverse bias applied to the OLED 10 is a dc voltage having a level approximately between 0 and 10 volts, dc. The reverse bias is generated by a sensing biasing circuit 50, which is coupled to the front terminal 42. A rear terminal 44 is coupled to output sensing circuitry 60, which could include e.g., a sense amplifier used to amplify the photocurrent generated by the OLED sensing light. The sensing circuitry 60 has an intensity output terminal 66, where an output varies based on the amount of light energy hitting the OLED 10.

When light energy (indicated by wavy arrows) falls on the OLED 10, current flows from the rear terminal 44, which is sensed and measured by the sensing circuitry 60 and output at the intensity terminal 66. The output at the intensity terminal 66 indicates how much light is falling on the OLED 10.

Each OLED 10 may have its own biasing circuit 50 and sensing circuitry 60, or many OLEDs can share the same biasing and sensing circuits. By having the same biasing 50 and sensing 60 circuits drive a series of OLEDs 10, which is called multiplexing, a display can be more economical to build because by sharing circuits, fewer need be included in the display.

The light energy that the OLEDs 10 sense can be light from any source, internal to a display or external from it. For instance, the light may be ambient light in the room that is sensed by the OLEDs 10, and the signal generated from sensing it used to brighten or dim the entire display accordingly. Or, the light sensed may come from a light pen or laser pointer that is pointed at a screen made of OLEDs 10. Further, the OLEDs 10 can sense light emitted by other OLEDs. By having the OLEDs 10 be in a sense mode for at least a short time period during a time a display is operating, the OLEDs 10 can be generating a portion of the display in one moment, then be sensing light in another.

Just as light that is emitted from an OLED has a certain spectral characteristics, light that is sensed by the OLED also has spectral characteristics. In order to be sensed by an OLED, the photon hitting the SCDR 24 (FIG. 3) must have energy equal to or in some cases greater than the bandgap voltage of the material composing the organic layer 20. Because different materials are used for the organic layers 20, in order to produce a red, green, and blue signal, the spectrum sensitivity of these materials may not be identical, and most likely probably would not be the same as one another. Optimization of the selection and operation of the organic material layer 20 to achieve the best emitting and sensing characteristics is best performed by the implementer of a system that uses sensing and emitting OLEDs.

In addition to sensing light that is shining from outside a display, the OLEDs 10 can also sense light that is within the display itself, i.e., light that is generated by other OLEDs. As mentioned above, many of the photons produced within the organic layer 20 (FIG. 1) do not exit the OLED 10, but are rather self-extinguished in the organic layer, or exit the OLED 10 in a direction other than out from the display to the viewer. In some displays only about ⅓ of the total generated light is actually presented to the user, with the rest being self-absorbed or emitting in the direction of a neighboring OLED 10.

Although the OLEDs 10 cannot be in both the emitting mode and sensing mode simultaneously, the OLEDs 10 adjacent to an emitting OLED can be in sensing mode. In this way, the OLEDs 10 can actively sense an amount of light generated by a neighboring OLED, as the neighboring OLED is generating light. Application of these unique properties is discussed below.

Figure 5:
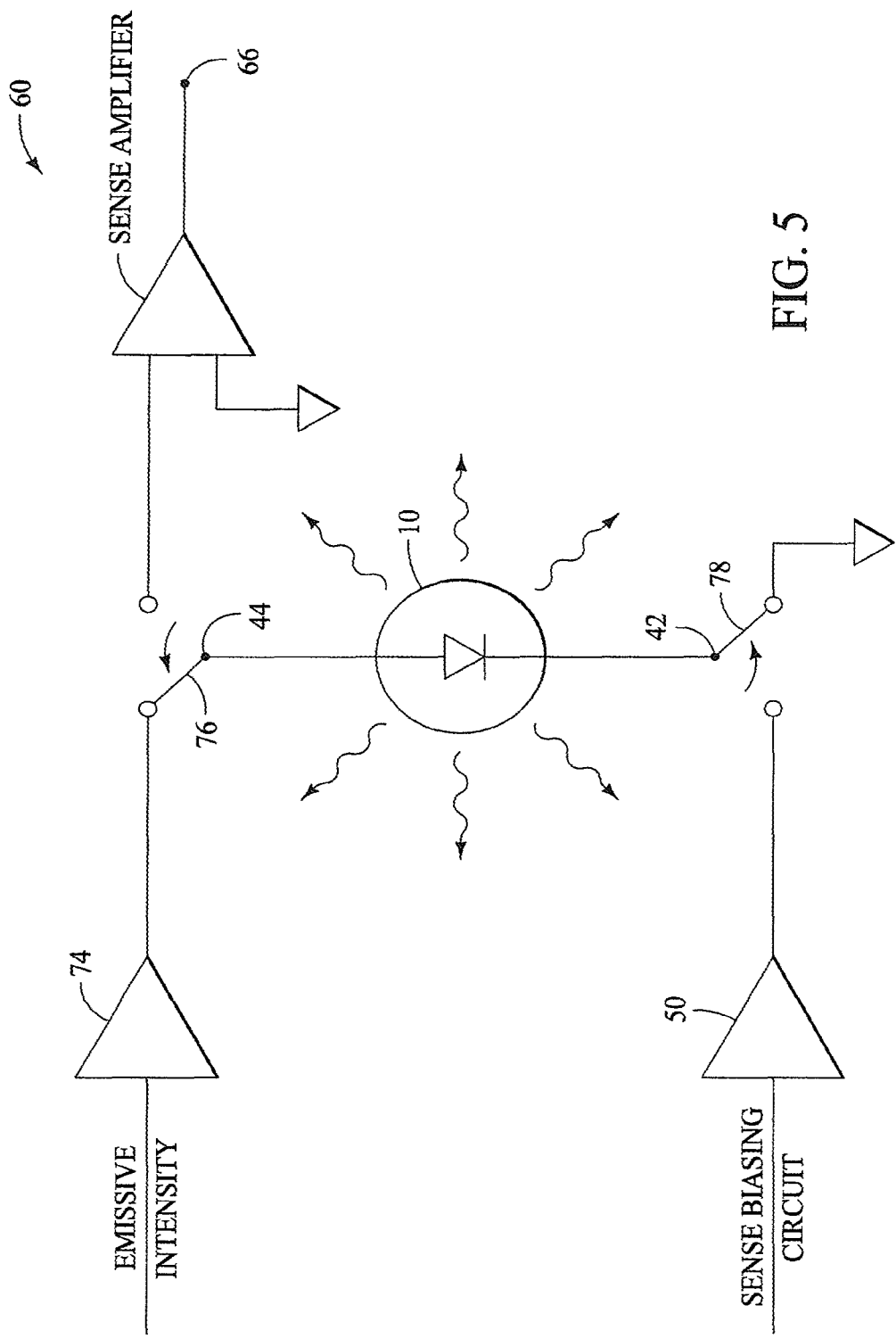
FIG. 5 is a circuit diagram showing additional circuitry used in conjunction with embodiments of the invention.

FIG. 5 shows how the sense driving circuitry 40 can be easily modified to also incorporate forward driving circuitry, to make a complete emitting and sensing driving circuit 70 for an OLED 10. In addition to the components present in the sense driving circuit 40, the complete emitting and sensing driving circuit 70 includes a forward driving circuit 74 coupled to the rear terminal 44. Additionally, a pair of switches 76, 78 is coupled to the OLED 10 to connect the OLED to the proper emitting or sensing circuitry at the correct time. The forward driving circuit 74 provides a driving current to the OLED 10 to cause it to emit photons. As more current is provided, more photons are emitted by the OLED 10.

During forward operation, i.e., when the OLED is in emit mode, the switch 76 couples the forward driving circuit 74 to the rear terminal 44; and the switch 78 couples the front terminal 74 to a ground or other reference voltage. When the OLED 10 is connected in this way and when the forward driving circuit 74 is generating a signal that causes the OLED to produce photons, the OLED generates light and can be made as a part of a display.

As mentioned above, the signal generated by the forward driving circuit 74 controls the light output of the OLED 10 to which it is connected. Therefore, the signal presented to the forward driving circuit 74 is an emissive intensity level. By controlling the emissive intensity levels for all of the pixels that make up a display, an image can be made that is seen by a viewer. Each of the different colors of OLEDs 10 will have their own emissive intensity levels to produce the same brightness level of output. Therefore, one solution in a display is to have a different set of forward driving circuitry 74 for each of the different colors of OLEDs 10. In other words, in those embodiments, at a minimum one set of forward driving circuitry 74 for each color, red, green, and blue must be included in the display.

During reverse operation (sense mode), the switch 76 couples the rear terminal 44 to the sensing circuitry 60, and the switch 78 couples the front terminal 42 to the sensing biasing circuit 50, forming a circuit similar to that shown in FIG. 4. As mentioned above, the sensing biasing circuit 50 reverse biases the OLED 10 anywhere from about 0 volts to about 10 volts, dc. During operation when the OLED 10 is connected in this mode, the OLED senses light energy falling on it. As mentioned above, the light energy sensed by the OLED 10 can be from an external source, i.e. from a source outside a display, or can be from another source inside the display itself, i.e. from another OLED.

The switches 76, 78 can operate very quickly to change the OLED 10 from emitting to sensing mode very fast. The physical switching time of the OLED 10, which is related to the physical parameters of the organic material layer 20 (FIG. 1) is on the order of a few nanoseconds. Therefore, it is possible that the switches 76, 78 can be switched thousands or even millions of times per second. If the same emitting and sensing circuitry 70 is driving a large group of OLEDs 10, parasitic capacitance issues may prevent the emitting and sensing circuitry from changing that fast.

The duty cycle of the OLED 10, which is the time the OLED is in emit mode compared to the entire operating time of the OLED, need not be 50%. Nothing prevents the OLED 10 from having a non-equal duty cycle between the emit mode and sense mode. For instance, having the emit mode only operative 50% of the time, as would be the case if there were an equal duty cycle between the emit and sense modes, may produce a display less bright than desired. Depending on what function the sensing mode is being used for in a display, the OLED 10 may be in the emit mode from 100 to 0 percent of the time, while being in sensing mode from 0 to 100 percent of the time. Additionally, not all of the OLEDs 10 in a display need to be in the same mode at the same time. For instance, there may be an average of 1 in 20 LEDs in the sense mode, reading light that is shining on a computer monitor while the other 19 are in emit mode.

As described with reference to FIG. 5, the forward driving circuit 74 can actually drive more than one OLED 10, by multiplexing the driving circuit to drive many OLEDs that operate at different times. Multiplexing is a way to save costs that is fairly easy to implement and does not cause any appreciable loss in image quality.

Figure 6:
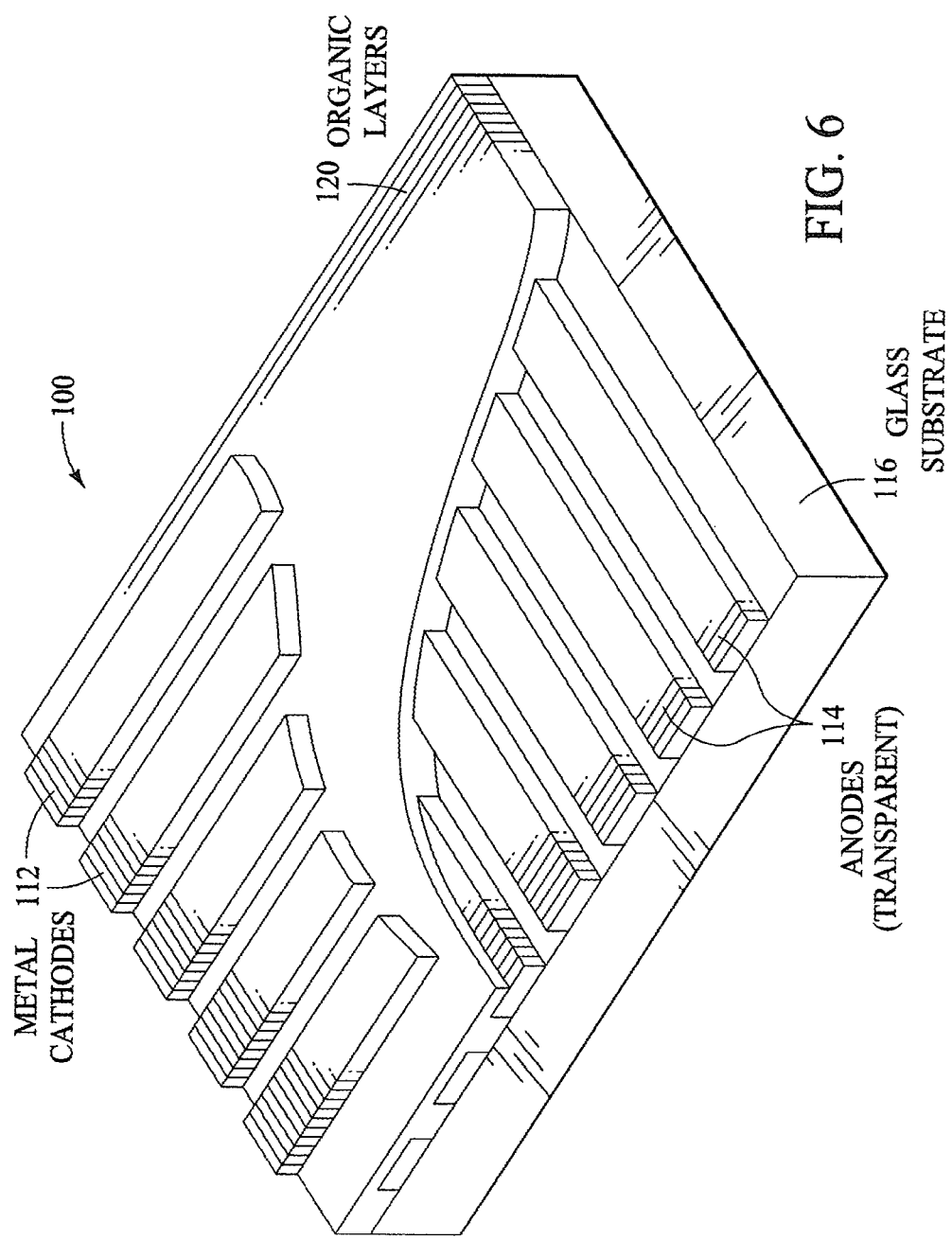
FIG. 6 is a perspective view of an information display made according to embodiments of the invention.

One way of making a display device from a series of OLEDs 10 is illustrated in FIG. 6. In that figure, a display 100 is shown, which includes cathodes 112, anodes 114, and an organic layer or layers 120. In the display 100 of FIG. 6, the anodes 114 are fairly narrow and evenly spaced apart in a first direction, and affixed to a see-through substrate 116, such as glass. The cathodes 112 are also fairly narrow and evenly spaced apart, but they are placed in a direction perpendicular to the direction of the anodes 114. The end product is the display 100 that has a separate diode 110 at every junction between a cathode 112 and an anode 114. If there are twenty cathodes 112 and twenty anodes 114 in the display 100, then there would be four-hundred diodes 110 in the display. With little modification and using techniques well known in the art, the display 100 could be made as either a passive type display or an active type display, a difference being the presence of individual transistors and energy storage devices used for each pixel in the active type display.

Figures 7, 8:
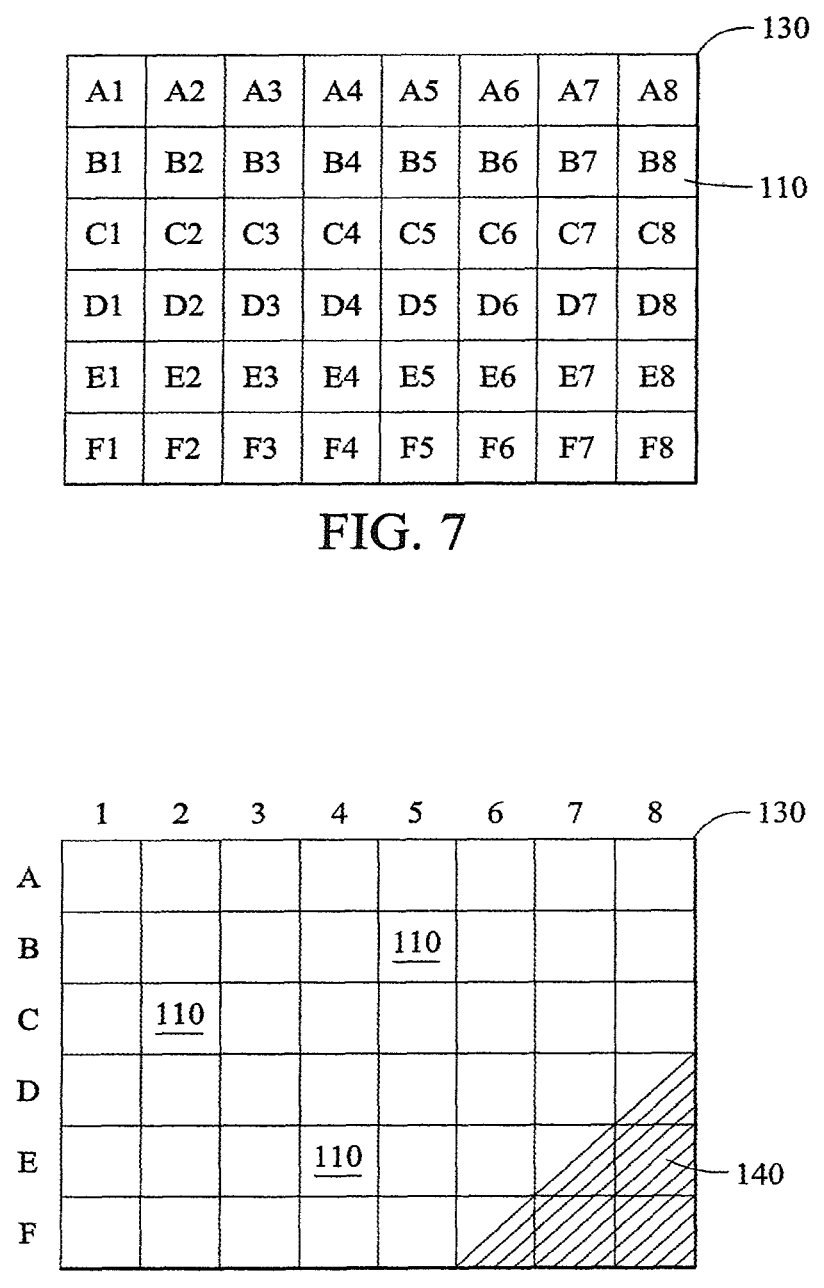

FIG. 7 shows a front view of a display 130 made according to embodiments of the invention. The display 130 has 48 total diodes 110, arranged in an 8×6 matrix, with rows labeled A-F and columns labeled 1-8. In practice, there would be many more diodes 110 in the display 130, of course, and they be so close that they were nearly indistinguishable from one another, unless the display was viewed under magnification.

Each of the diodes 110 in the display 130 is capable of operating in either the emit mode or the sense mode. As mentioned above, the emitting and driving circuitry 70 can be multiplexed to drive several of the diodes 110. One method of multiplexed driving is to simultaneously drive all of the diodes 110 in a single row, and then sequentially drive all of the rows making up the display 130, one row at a time. For instance, to create an image on the display 130, the emitting circuitry 40 could first drive all the diodes 110 in row A. After driving those diodes 110, the emitting circuitry would switch and drive all the diodes in row B. This would continue through the rows A-F until all of the rows have been driven, and the image generated on the display 130. The changing between the rows A-F happens so fast that the viewer of the image in the display 130 would not detect any switching or strobing of the rows, and instead the image appears as a constant image on the display.

By making a display 130 having diodes 110 that can both emit and sense light, functions to monitor the output of the display, even during the operation of the display, are achievable. In the following discussion of operational functions of the display 130, it is assumed that each diode 110 can be individually controlled to be in either the emit state, the sense state, or an off state where it is neither emitting nor sensing. Therefore, instead of a display 130 built as shown in FIG. 6, with all of the cathodes 112 in a row (or column) connected and all of the anodes 114 in a column (or row) connected, it is assumed that both the cathode 112 and the anode 114 are separate, allowing individual control of all of the diodes 110, as schematically shown in FIG. 5.

Sensing Brightness from Ambient Light

By making a display 130 from diodes 110 that can both emit and sense light, the brightness of each of the diodes in the display can be individually controlled. In such a mode at least some of the diodes 110 of the display 130 toggle between their emit and sense states, or some of the diodes 110 remain in their sense states. The number of diodes 110 in the sensing state is determined by a number of factors, including, for instance, the energy sensing sensitivity of the individual diodes, and where in the display 130 the sensing diodes are placed, etc. In the sensing ambient light mode, the diodes 110 turn on for a time period in their emit mode to make their portion of the image on the display 130. Then the diodes 110 switch to their sense state and sense ambient light falling on the display 130. In their sense state, each of the diodes 110 quantifies the amount of light falling on it. When the diodes 110 change again back to their emit state, they use the quantified information of how much light is/was striking them in the present or in the previous sense state to control the current brightness of the individual diode. In other words, when the diodes 110 sense more light energy shining on them than in a previous cycle, or they sense more light energy shining on them than other diodes 110 in the present cycle, or when the sense an amount of light more than a permanently stored value, more driving current is supplied to those particular diodes to make the diodes shine brighter. Conversely, if the diodes 110 have less light energy shining on them than those diodes around them, or have less light energy than they did in a previous cycle, or measure less light than a previously stored value, less current is applied to those diodes, and they will shine less brightly in the present cycle.

For an example to illustrate this mode, consider a shadow 140 covering a portion of the display 130, as shown in FIG. 8. Those of the diodes 110 that are completely in the shadow 140 (E8, F7-8) would sense less light energy than those diodes around them or than when the shadow was not present. Those diodes that are partially in the shadow 140 (D8, E7, F6) would also sense an amount of light energy between those diodes 110 that were completely out of the shadow 140, and those that were completely in it. Data of the reduced light energy is fed back to the emitting and sensing driving circuitry 70, which would in turn proportionally decrease the emission current output to those cells that were either partially or fully in the shadow, making them shine less brightly. Those diodes 110 outside of the shadow 140 would continue to be driven by the same energy as before the shadow was present. The result is a display 130, partially occluded by a shadow 140, but appearing to the viewer as one having constant brightness across the entire display.

Another example (not shown in FIG. 8) is a display 130 that has a flashlight shining a beam on a portion of the display. When each of the diodes 110 that are under the flashlight beam detects that they are in a lighted area, it signals the presence of the light energy to the emitting and sensing driving circuitry 70, which automatically increases its light output to compensate for the flashlight beam. The other diodes 110 remain at the same brightness output as before. Again, similar to where the display 130 is partially blocked by a shadow, 140, the viewer sees uniform brightness across the entire display. By switching quickly enough between the emit and sense states, the display 130 can self-correct brightness conditions in real time. Therefore, no change in brightness of the display 130 would be detected, even as the flashlight beam sweeps across the display.

For embodiments of this mode, it is not necessary that every diode 110 switch between the emit mode and the sense mode. For example the display 130 may be set up so that some diodes 110 that are spread over different areas of the screen are always in the sense mode, while other diodes are never in the sense mode. This would be akin to having photodiodes placed all about the screen, but not interfering with the image showing on the display 130. As few as one diode 110 or as many as all of the diodes 110 of the display 130 can be used to sense the ambient light during some time of the duty cycle of the diodes, with the signal received from the sensing diodes being used by the emitting and sensing driving circuitry 70 to modulate the emission signal of all of the emitting diodes.

Figure 9:
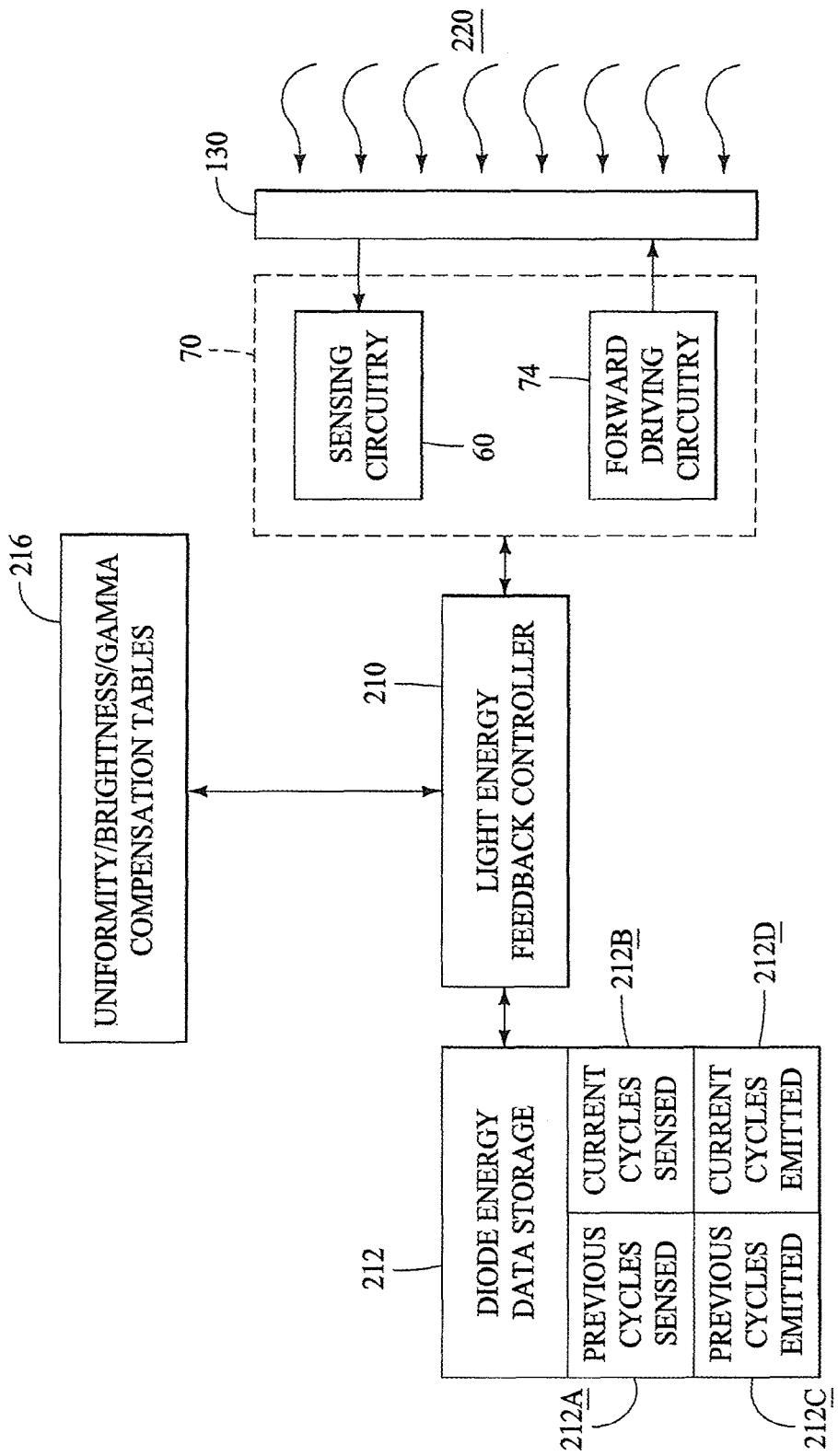
FIG. 9 is a block diagram showing components that can be used to implement embodiments of the invention.

An example system that could implement such a display mode as describe above is shown in FIG. 9. The display 130 has different amounts of light, or other detectable energy 220 shining on different portions of it. The amount of energy sensed is fed back to a feedback controller 210, which accesses data from the previous cycles stored in a memory or storage 212, and interfaces with one or more compensation processes or tables 216. The feedback controller 210 determines how much to adjust the driving energy applied to the forward driving circuitry 74, if any, and provides that signal to the driving circuitry. The forward driving circuitry 74 then drives the diodes 110 with the proper current to produce the proper amount of intensity for the generated image.

In more detail, at least one of the diodes 110 (not shown individually) that makes up the display 130 senses the amount of light 220 shining on it. The sensed light information is measured by the sensing circuitry 60, which is a part of the emitting and sensing driving circuitry 70 (FIGS. 4 and 5), and is fed to the light energy feedback controller 210. The feedback controller 210 is coupled to the diode energy data storage 212, which is divided into four sections. A first section 212A stores the amount of energy received by the diodes 110 in the previous cycle, and may include historical data for several cycles. A second section 212B stores the amount of energy received by the diodes in the current cycle. A section 212C stores an indication of the amount of driving current applied to the diodes 110 in the previous cycle, which again may include several previous cycles of data. A section 212D stores an indication of an amount of current to be supplied to the diodes in the present cycle.

The feedback controller 210 accesses whatever information is needed from the data storage 212, and communicates with any necessary compensation tables 216 to determine the correct amount of driving current to supply to the diodes 110 to compensate for any outside influence. Of course, the compensation tables 216 need not be tables at all, and could be a process that runs a function based on input provided by the feedback controller 210, and provides the function output in return.

For example, to sense ambient light, the diodes that are in the sense mode supply the amount of sensed light 220 to the feedback controller 210. The feedback controller can retrieve the amount of light 220 sensed in previous cycles from the section 212A, or it may compare the amount of light sensed with the other diodes 110 on the display 130, or may even compare that amount with a set of permanently stored values. The feedback controller then communicates with the compensation tables 216 to determine the new level of current for driving the diodes, then communicates the new level to the data storage 212, to be stored in the section 212D, and to the forward driving circuitry 74 to be applied to the individual pixel. In this way, any number of pixels in the display 130 can sense an amount of ambient light, which may be applied to a representative group, or individually to each of the pixels in the display.

Uniformity Calibration of Pixel Brightness

A mode related to the above mode is that diodes 110 in the display 130 can be used to help calibrate the individual brightness response of other diodes 110 from a standard driving current. As mentioned above, due to a variety of factors, individual OLEDs 10 can produce differing amounts of brightness even when they are driven by the same amount of driving current. A display 130, which is made from diodes 110 that can both emit and sense light, can compensate for these individual differences, either when the display 130 is being manufactured, or during the operation of the display 130.

Figure 10:
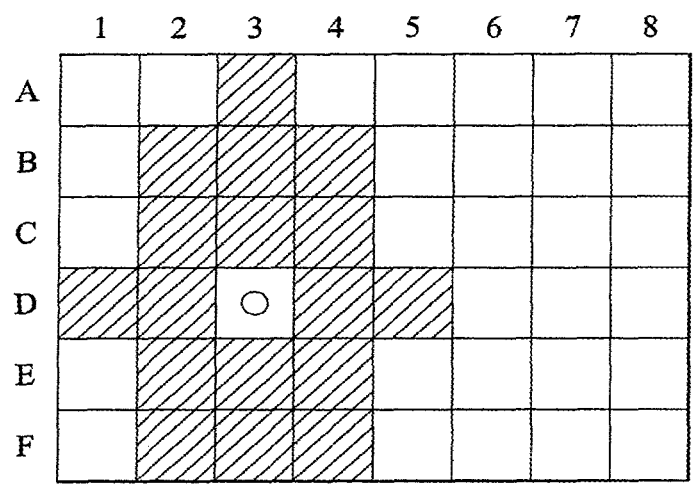
FIG. 10 is a front view of the display shown in FIG. 7, showing a pixel in an emit mode, and several pixels in a sense mode, according to an embodiment of the invention.
Figure 10:
Figure 10:
Figure 10:

When the display 130 is being manufactured, a uniformity calibration can be performed by measuring the output of each of the individual diodes 110, and normalizing them against one another. For instance, the display 130 can be controlled to set a diode 110 in its emit mode, and set neighboring diodes in their sense mode. FIG. 10 shows a diode 110 at location D3 being tested. In this example, the diode 110 at D3 is in its emit mode, while others around it (A1, B2-4, C2-4, D1-2, D4-5, E2-4, and F2-4) are set in their sense mode. If the display 130 included an additional row, then diode 110 at F3 would also be in its sense mode. Of course, any number of diodes 110 may be used in the sense mode, and not only those shown in FIG. 8B. External light shining on the display 130 may be minimized by performing the test in a darkened condition, or other techniques used to ensure that a uniform amount of light is showing on the display, as non-uniform lighting may skew the uniformity test.

The diode 110 at D3 is lit by driving it with an emitting signal as described with reference to FIG. 5, and the surrounding diodes (A1, B2-4, C2-4, D1-2, D4-5, E2-4, and F2-4) measure the amount of light internally generated by the lit diode D3. The results may be recorded for later changes, or the diodes 110 can be adjusted in real-time by having the diodes in sense mode feedback their information through the forward driving circuit 74 (FIG. 5).

If the data is recorded for the brightness characteristics of each diode 110, then once the performance data for the first diode is recorded the display 130 puts another diode 110 in emit mode, e.g., D4. The diodes in an area around the diode D4 then similarly change to the sense mode, and the test is repeated. This procedure continues until all of the diodes 110 of the display 130 have been measured, and possibly until they have been measured multiple times and under different conditions. Another way to check the brightness of all of the diodes 110 is to light all of the diodes in one row simultaneously, set the diodes in adjacent rows to the sense mode, and read the amount of light sensed by rows of diodes above and below the lit row. Except for the diodes 110 near the end of the rows, the brightness should be relatively uniform for each of the sensing pixels in the middle of the rows.

Once the diodes 110 of the display 130 have been measured, adjustments can be made to the diodes to normalize their output to one another, such as by changing their driving current, or applied driving current, etc. Another embodiment may store an indicator of the brightness of each diode 110, and later when the diode 110 is in its emit mode, modify its driving current by consulting the stored indication of its previous brightness score.

A combination of the above two modes could include performing a normalizing brightness test on each of the diodes 110 in the display 130, and initially set each diode accordingly. Later, as the brightness of the diodes 110 change over time, e.g., as the display 130 ages, the diodes in their sensing mode can automatically correct for changes in brightness by using the techniques described above. In this way, embodiments of the invention are capable of performing both an initial brightness calibration, such as one done at manufacture, and/or a self-calibration, such as one performed periodically, and/or even still as a continuing brightness calibration, in real-time as the display 130 is operated.

The system shown in FIG. 9 could be used to implement the brightness calibration mode. In operation it functions similar to sensing ambient light, described in the above section, but instead, in this case the light is generated by the diodes themselves. Previous data of the brightness intensity is stored in the memory 212A, which is accessed by the feedback controller 210. The feedback controller 210 determines what that proper driving signal should be with the help of the compensation tables 216, and sends that signal to the forward driving circuitry 74, and may send the data to be stored in the section 212D of the memory 212 as well.

Gamma Uniformity Calibration of Pixels

Embodiments of the invention are additionally able to perform a gamma uniformity of the diodes 110 of the display 130 based on the actual gamma response of the individual diodes. This mode is similar to the brightness uniformity of the individual diodes 110 described above, and could be implemented in a similar way where one or more diodes are tested while others measure their performance. One difference, however, is that measurements of the output of the diodes 110 is made for output of the diodes from full dark to full bright (the "gamma curve" or "general transfer function" of driving current to brightness output). The measurements can be made in a relatively few points along the curve, or they can be made at many points along the curve. The "gamma numbers" may be used only once when the display is being manufactured to permanently modify the gamma curve for the individual diodes 110, or they may be stored in the display 130 for later updating. Similar to the brightness test described above, embodiments of the invention are capable of performing both an initial gamma calibration, such as at manufacture, or a self-calibration, such as one performed periodically, or even still as a continuing gamma calibration, in real-time as the display 130 is operated.

A gamma uniformity test could be a portion of a self test performed when a user powers the display 130, whereby the gamma numbers that were stored previously were are updated, or the gamma uniformity test could be performed upon request of the user.

The system shown in FIG. 9 could also be used to implement the gamma uniformity mode, similar to the way the brightness uniformity mode is implement. One difference would be that the memory 212 could store data points along the gamma curve for each of the diodes 110, and not just a single brightness number. Another difference would be the tables or functions that the feedback controller 212 would communicate with in the compensation tables 216. As above, once the new driving signals were determined, they would be sent to the forward driving circuitry 74 to drive the diode 110, and also stored in the data storage 212.

Sensing an External Pointing Device

A further possibility of use for the display 130 is that it could be used to sense the position of a laser or other type of external pointing device, and even possibly integrate the response of the pointing device with operations performed on the display. As shown above, the display 130 can sense when light energy is striking the display, in real time. Also, by determining which of the pixels are sensing energy, the position of the energy on the display 130 can be determined. Therefore, an application of this feature can detect the presence and position of a pointing device, and, once the presence and position is known, could even allow the movements of the pointing device shining on the screen to control the output of the display 130.

Figure 11:
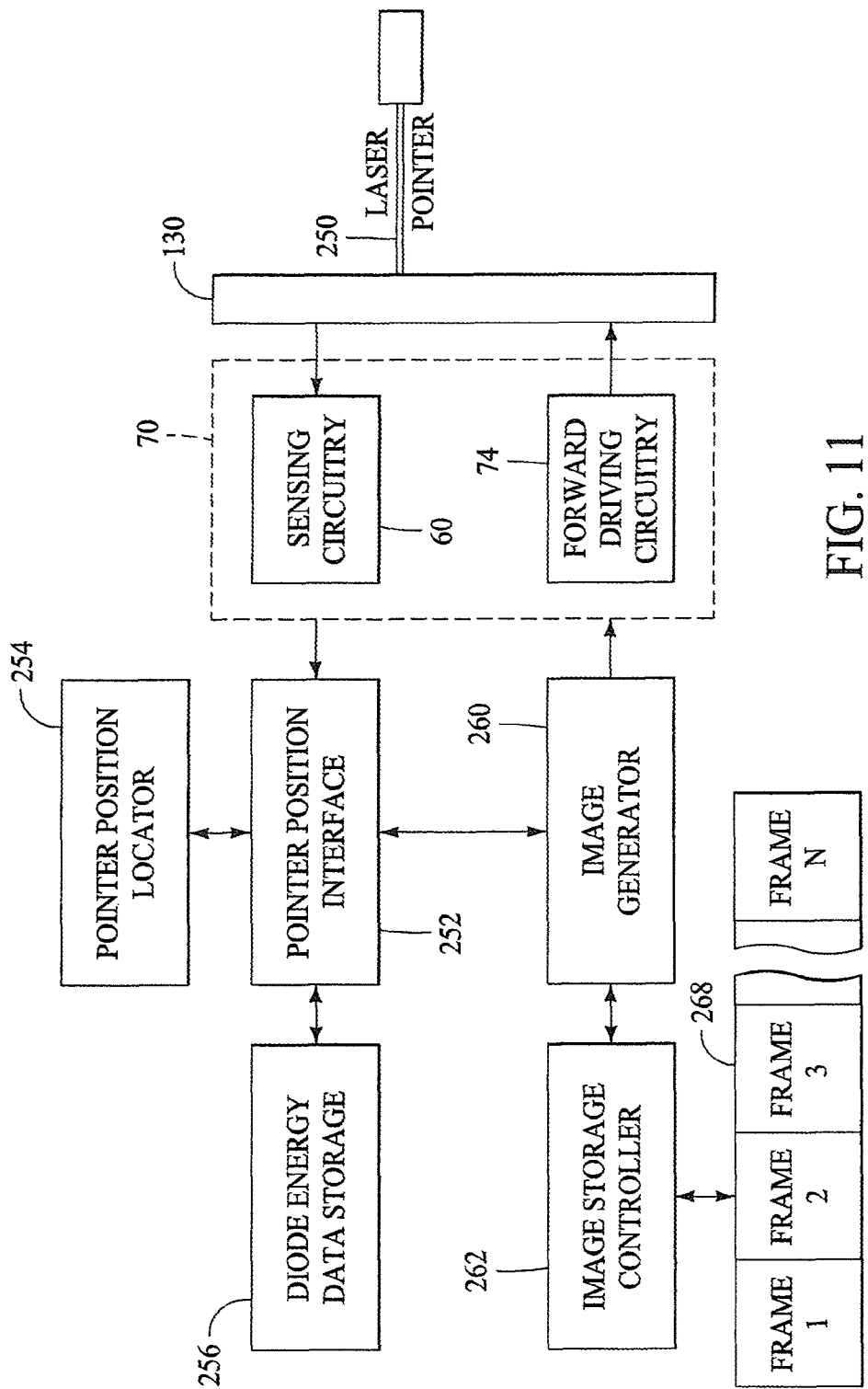
FIG. 11 is a block diagram showing components that can be used to implement embodiments of the invention.

A system that could implement this mode is illustrated in FIG. 11. In that system, the display 130 has a laser pointer 250 or other energy source shining on the display. The location of where the pointer 250 is pointing on the screen and any action taken by the pointer, such as clicking or double-clicking, is determined by a pointer position interface 252. The positional and action information is forwarded to an image generator 260, which can utilize the actions as input to determine which image to show next. Once determined, the image generator sends the image data to the forward driving circuitry 74 to drive the diodes 110 (not individually shown in FIG. 11) of the screen 130 to make the displayed image.

In one embodiment, the movement of the pointer 250 could simply be substituted for the input of a computer mouse. Pointing action is performed by tracking where the pointing device is currently positioned on the display 130 by sensing the light energy by having several or all of the diodes 110 in the display be in sensing mode at some time. A clicking action could also be sensed by detecting a pulse of light from the pointer, or perhaps a different frequency pointer (different color) could provide the distinction between a clicking action and a non-clicking one, for example. It is possible that all of the diodes 110 of the display 130 be in sensing mode during times they are not emitting light. For example, if only one row of diodes 110 is being driven to emit light at a particular instant, the other rows, which would otherwise be in an idle mode or turned off, could be in the sense mode.

In operation, the pointer could select objects being displayed on the display 130, such as a presentation having "next" arrows, or a Hyper Text Markup Language (HTML) page being shown. Clicking on a portion of the HTML page could cause other HTML pages or images to be shown on the device 130.

In more detail, the system shown in FIG. 11 includes a pointer position locator 254 coupled to the pointer position interface. Additionally coupled to the pointer interface is a sensed energy data storage 256, which is used to store energy data sensed by the diodes 110 of the display in the previous cycle or cycles. The location where the pointer 250 is pointing could be determined by comparing the sensed energy from the diodes 110 to one another, or by comparing them to the energy sensed by the diodes in a previous sensing cycle. Because the pointer 250, especially if it is a laser pointer, is very focused and bright, an exact position on the screen should be straightforward to calculate based on the amount of light energy sensed by the diodes in sensing mode. Also, the pointer position interface could calculate a pointer action, similar to a mouse click, by detecting a pulsed pointer, or a pointer switched to another color, which may affect the amount of energy sensed by the diodes 110.

The position and state of the pointer 250 is passed to the image generator 260 as a form of input. The image generator can then determine which image to show next, and communicate with an image storage controller 262 to select the proper image. An image repository 268 is coupled to the image storage controller and stores a number of frames to be displayed. As an example, assume the display 130 is showing a power point presentation that has a forward arrow to select the next slide, and a back arrow to select another slide. The pointer 250 clicks on the back arrow, which is sensed by the pointer position interface and sent to the image generator 260. The image generator knows to go back to the most recently shown frame, and directs the image storage controller to select that frame from the frame repository 268. Once selected, the image data is sent back to the image generator, which formats it and sends the proper signals to the forward driving circuitry 74 to drive the diodes 110 with the signals to create the desired image.

Although the above examples described the display 130 detecting an external light signal, such as from the light pointer 250, the display is equally effective at detecting an external shadow. For instance, the display 130 could detect a shadow made by an operator's finger, thereby having function similar to a touch screen.

Electronic White Board

A display 130 such as described herein could be a component of an electronic display screen, operating in much the same way as for detecting a pointing device above. In this operation, light generated from a light pen, or other device, is sensed by the diodes 110 of the display 130. Input sensed by the display 130 is immediately sent to the pointer position interface 252 that reads the input, and sends that input to the image generator 260. The image generator determines an image to show and sends the image to the forward driving circuitry 74 to show the image on the display 130. For example, if a viewer "wrote" the letters INTEL® on a display 130 using a light pen, the display could show the same letters display, as it is being written. In a related embodiment, the display 130 could sense different "colors" of light pens, such as, for example, by assigning a certain frequency or intensity to a particular color of pen, then associating the particular sensed pen with a color previously stored in the image generator 260. Then, the associated color is shown on the display 130 in the areas where that particular color was used as input to the display.

By creating display that can simultaneously emit an image in one portion while detecting energy input to the display at another portion, or that can switch between emitting and sensing modes quickly enough to avoid detection, tremendous possibilities for use exist. In effect, such a display becomes both an input and an output device, where images can be outputted to a viewer, but where the viewer can also interact with the display as an input. Any form of energy that is capable of being sensed by the display as disclosed above can be used as an input to the system that is coupled to the display. OLEDs may be capable of emitting only a narrow bandwidth of light, but be able to sense a much larger bandwidth.

Although examples of displays made from OLEDs have been discussed above, nothing prevents embodiments of this invention to work with other types of LEDs, for example those made with inorganic semiconductor material such as Silicon or Gallium-Arsenide. Any diode that is capable of emitting photons in one mode and sensing energy in a second mode can be incorporated into embodiments of the invention.

Implementation of the display that can emit and sense photons is straightforward to implement in light of the above disclosure. As always, implementation details are left to the system designer. The circuits used to drive the diodes in the display may be implemented in any way, with any components as long as they can cause the diodes to perform the necessary functions in the display. One particular optimization that may be best determined empirically is the duty cycle of the diodes between the emitting mode and the sensing mode. Having the diodes spend the majority of a duty cycle in the emitting mode may yield better display efficiencies, while having the diodes spend the majority of the duty cycle in the sensing mode may yield better energy detecting efficiencies.

Thus, although particular embodiments for a display including an energy sensing diode has been discussed, it is not intended that such specific references be considered as limitations upon the scope of this invention, but rather the scope is determined by the following claims and their equivalents.

What is claimed is:

1. A display device, comprising:
a plurality of light emitting diodes (LEDs) forming a display of the display device;
a sensing circuit configured to detect a shadow over at least a portion of the display; and
a driving circuit coupled to the plurality of LEDs, the driving circuit configured to drive the plurality of LEDs to emit light and to independently drive at least two LEDs of the plurality of LEDs to emit light based at least in part of the detected shadow.

2. The display device of claim 1, wherein the shadow is from an operator's finger.

3. The display device of claim 1, wherein the display is a touch screen.

4. The display device of claim 1, wherein the display device is associated with at least one of a portable device, a laptop computer, a telephone, and a personal digital assistant (PDA).

5. The display device of claim 1, wherein the sensing circuit is configured to receive an electrical signal from each LED of the plurality of LEDs when that LED is operated in a sense mode.

6. The display device of claim 5, wherein:
the plurality of LEDs includes first and second LEDs that are electrically connected to the driving circuit and the sensing circuit;
the sensing circuit is configured to sense first and second amounts of light incident on the first and second LEDs, respectively; and
the driving circuit is configured to individually control a brightness level of the first and second LEDs responsive to the first and second amounts of light, respectively, incident on the first and second LEDs as detected by the sensing circuit.

7. The display device of claim 6, wherein the driving circuit is configured to drive the first LED in response to an amount of light sensed by the second LED of the LEDs.

8. The display device of claim 6, wherein:
the driving circuit is configured to drive the first LED in response to an amount of light incident on the first LED sensed from an earlier point in time; and
the driving circuit is configured to drive the second LED in response to an amount of light incident on the second LED sensed from the earlier point in time.

9. The display device of claim 1, wherein:
the shadow covers a portion of the display;
a first portion of the LEDs are located completely in the shadow and configured to sense a first level of light energy;
a second portion of the LEDs are located completely out of the shadow and configured to sense a second level of light energy; and
a third portion of the LEDs are located partially in the shadow and configured to sense a third level of light energy.

10. The display device of claim 9, wherein:
the sensing circuit is configured to receive data including the first, second, and third levels of light energy;
the driving circuit is configured to decrease current output to the LEDs that are completely or partially in the shadow based on the data so that the display appears to have one constant brightness across the entire display.

11. An apparatus for a display device, comprising:
a plurality of light emitting diodes (LEDs) to provide illumination for a display;
a sensing circuit configured to detect a light energy over at least a portion of the display; and
a driving circuit coupled to the plurality of LEDs, the driving circuit configured to drive the LEDs of the plurality of LEDs to emit light and to independently drive at least two LEDs of the plurality of LEDs to emit light based at least in part on the detected light energy.

12. The display device of claim 11, wherein the display device is associated with at least one of a portable device, a laptop computer, a telephone, and a personal digital assistant (PDA).

13. The display device of claim 11, wherein the sensing circuit is configured to receive an electrical signal from each LED of the plurality of LEDs when that LED is operated in a sense mode.

14. The display device of claim 13, wherein:
the plurality of LEDs includes first and second LEDs that are electrically connected to the driving circuit and the sensing circuit;
the sensing circuit is configured to sense first and second amounts of light incident on the first and second LEDs, respectively; and
the driving circuit is configured to individually control a brightness level of the first and second LEDs responsive to the first and second amounts of light, respectively, incident on the first and second LEDs as detected by the sensing circuit.

15. The display device of claim 14, wherein the driving circuit is configured to drive the first LED in response to an amount of light sensed by the second LED of the LEDs.

16. The display device of claim 14, wherein:
the driving circuit is configured to drive the first LED in response to an amount of light incident on the first LED sensed from an earlier point in time; and
the driving circuit is configured to drive the second LED in response to an amount of light incident on the second LED sensed from the earlier point in time.

17. A method of operating a display having a plurality of light emitting diodes (LEDs), the method comprising:
driving each LED in an emit mode to display an image on a display;
switching at least one LED from the emit mode to a sense mode;
sensing an electrical signal from the at least one LED in the sense mode;
detecting a shadow on the display;
switching the at least one LED from the sense mode to the emit mode; and
driving, independently, at least two LEDs of the plurality of LEDs in an emit mode to modify an intensity of light emitted from the at least two LEDs of the plurality of LEDs based in part on the detected shadow to display the image on the display.

18. The method of claim 17, wherein detecting a shadow includes detecting the shadow from an operator's finger.

19. The method of claim 18, wherein the switching of the at least one LED from the emit mode to the sense mode, the sensing of an electrical signal from the at least one LED, and the switching of the at least one LED from the sense mode to the emit mode occurs while the image is being displayed on the display.

20. The method of claim 17, wherein the display is associated with at least one of a portable device, a laptop computer, a telephone, and a personal digital assistant (PDA).

* * * * *